United States Patent [19]

Ito et al.

[11] 4,435,346
[45] Mar. 6, 1984

[54] METHOD OF PRODUCING OPEN-CELL FOAMED ARTICLES OF CROSS-LINKED POLYOLEFINS

[75] Inventors: Hiroo Ito; Takeo Kasanami, both of Joyo; Shuji Miura, Uji, all of Japan

[73] Assignee: Sanwa Kako Company, Limited, Kyoto, Japan

[21] Appl. No.: 357,682

[22] Filed: Mar. 12, 1982

[30] Foreign Application Priority Data

May 22, 1981 [JP] Japan ................................. 56-76700

[51] Int. Cl.³ ............................................. B29D 27/00
[52] U.S. Cl. ..................................... 264/54; 264/321;
264/DIG. 5; 264/DIG. 13; 264/DIG. 18
[58] Field of Search .......... 264/DIG. 18, 54, DIG. 5, 264/DIG. 13, 321

[56] References Cited

U.S. PATENT DOCUMENTS 3,394,214 7/1968 Benning ...................... 264/DIG. 18

FOREIGN PATENT DOCUMENTS 41-8840  5/1966 Japan .
42-18832 9/1967 Japan .
43-22674 9/1968 Japan .
45-29581 9/1970 Japan .
49-10350 3/1974 Japan .
54-63172 5/1979 Japan .
56-130   6/1981 Japan .

Primary Examiner—Philip E. Anderson
Attorney, Agent, or Firm—Armstrong, Nikaido, Marmelstein & Kubovcik

[57] ABSTRACT

An open-cell foamed article of a cross-linked polyolefin having a high open-cell ratio and a high degree of expansion is produced by a method which comprises the steps of preparing a foamable and cross-linkable polyolefin composition, forming the composition into a desired shape maintaining its gel percent at zero, decomposing the cross-linking agent and blowing agent concurrently by heating the composition under atmospheric pressure in such conditions that the peak of the ratio of the degree of cross-linking to the degree of decomposition of the blowing agent is not more than 20 and exerting a mechanical deformation to the resulting polyolefin foam to rupture the cell membranes.

13 Claims, 2 Drawing Figures

FLOW DIAGRAM OF PROCESS

FLOW DIAGRAM OF PROCESS

METHOD OF PRODUCING OPEN-CELL FOAMED ARTICLES OF CROSS-LINKED POLYOLEFINS

BACKGROUND OF THE INVENTION (1) Field of the Invention

This invention relates to a method for the production of open-cell foamed articles of cross-linked polyolefins.

(2) Description of the Prior Art

Among the methods heretofore suggested for the manufacture of cellular articles of cross-linked polyolefins, particularly of polyethylene, the methods which use the organic decomposition type blowing agents are generally known in the art. These methods, as disclosed in Japanese Patent Publication Nos. 8840/1965, 18832/1967 and 22674/1968, generally comprise the steps of first cross-linking polyethylene by means of an organic peroxide or by exposure to electron beams and thereafter decomposing the blowing agent thereby imparting a cellular structure to the cross-linked polyethylene. In addition, there have been known a method in which a foamable and cross-linkable composition containing a polyolefin, a blowing agent and a cross-linking agent is heated in a closed mold under increased pressure and thereafter the pressure applied to the composition in the mold is released resulting in the foamed cross-linked polyethylene, and also so-called "two-step" method, as disclosed in Japanese Patent Publication No. 29381/1970, in which the foamable and cross-linkable polyolefin composition is heated in the same manner as above to partially decompose the blowing agent and thereafter further heated under atmospheric pressure to decompose the remaining blowing agent. In the latter two methods, since the decomposition of blowing agent and cross-linking agent is effected by heating the composition in the closed mold under pressure, the cross-linking reaction of polyethylene takes place but the foaming is suppressed, and the expansion of polyethylene occurs only after the release of applied pressure. Therefore, the latter methods are same as the former methods in principle that polyethylene is first cross-linked and thereafter expanded.

The foamed products of cross-linked polyolefins obtained by the above mentioned methods have a closed cell structure. By these methods, it will be difficult to obtain a foamed product having an open cell structure. This is because, unlike the reactive foaming such as is involved in the production of polyurethane foam, the foaming of cross-linked polyolefin according to the prior methods produces closed cells, and the membranes enclosing these cells are so tough that, even under application of compressive force, they will not be ruptured to transform such closed cells into open cells and, even if the membranes are forcibly ruptured somehow or other, the ruptured cell membranes will not be retained as they are. Owing to the melt elasticity possessed commonly by polyolefins, such ruptured cell membranes cannot be retained as they are, without reference to the particular type of blowing agent and the presence or absence of cross-linking reaction. With the escape of the expanding gas, there ensues the phenomenon of contraction of cell membranes or occurrence of empty cavities. This phenomenon becomes more conspicuous with the increasing expansion degree of polyolefin foam.

In the above circumstances, the greater part of the commercially available open-cell foamed articles is polyurethane foam. However, polyolefins exhibit excellent weathering resistance as compared with the soft urethane resin typifying those resins which are capable of producing open-cell foamed articles and also have very good resistance to chemicals and to water. Thus, debut of an open-cell foamed article made from this resin has long been awaited.

So far, a few methods aimed at the production of open-cell foamed articles of polyolefins have been proposed, for instance the methods which comprises blending polyolefin with a water-soluble powder such as starch and thereafter dissolving out the water-soluble powder from the mixture, and the sintering method in which the polyolefin powder is sintered. By these methods, however, there are barely obtained cellular products of very low expansion ratio of the order of about 2 to 3 times the original volume.

Recently, there have been proposed methods which effect rupture of the membranes of closed cells of a foamed cross-linked polyethylene by the action of compressive force. One of these methods is disclosed in Japanese Patent Publication No. 10350/1974. This method comprises cooling the foamed article of a thermoplastic resin having closed cells to a temperature below the second-order transition temperature (brittle temperature) of the thermoplastic resin and roll pressing the cooled foamed article thereby producing a cellular article having open cells. This method accomplishes the transformation of closed cells to open cells by sacrificing the strength of the thermoplastic resin itself to some extent. Another of the methods is disclosed in Japanese Patent Application laid open to public inspection No. 63172/1979. This method comprises producing a foamed article of polyethylene containing an inorganic filler and subjecting the formed article to compressive force thereby rupturing the membranes of closed cells and transforming the cells into open cells. This method attains the transformation of closed cells into open cells by adding to the resin a large amount of the inorganic filler enough to lower the strength of the resin.

The former method, however, has a disadvantage that a very long time is required to cool the foamed article having extremely low thermal conductivity to a temperature below the brittle temperature ($-100°$ C.) of the resin and the method, when desired to be carried through in a short period of time, is applicable only to foamed sheets of very small thickness.

The latter method also has a disadvantage that the method itself is hardly practicable and, if it is materialized by special technical efforts, the addition of the large amount of inorganic filler inevitably decreases the degree of expansion and increases the bulk density.

In any event, successful transformation of closed cells of a foamed cross-linked polyolefin to open cells on a commercial scale remains yet to be accomplished. This is because the polyethylene resin, etc. used as the raw material of the foamed cross-linked polyolefin are so tough, by nature, that the membranes of closed cells in the foamed article will not be ruptured under application of compressive force and, even if the compressive force is great enough to rupture such membranes, the compressive force is transmitted only in the surface region of the foamed article. The compressive force transmitted to the deep portion of the foamed article is no longer great enough to rupture the membranes in that portion. Thus, the desired transformation of closed cells into open cells has not been accomplished to date.

SUMMARY OF THE INVENTION

An object of this invention, therefore, is to provide a method for easily producing an open-cell foamed article of cross-linked polyolefin merely by imparting mechanical deformation to the foamed article without requiring any other special treatment or the addition of a filler.

Another object of this invention is to provide a method for the production of an open-cell foamed article of cross-linked polyolefin of a great thickness with a high degree of expansion.

Still another object of this invention is to provide open-cell foamed articles of cross-linked polyolefin possessing highly advantageous properties and having desired thicknesses with a high degree of expansion.

To accomplish the objects described above and other objects, according to the present invention, there is provided a method for the production of an open-cell foamed article of cross-linked polyolefin, which comprises blending the polyolefin with a decomposing-type chemical blowing agent and a cross-linking agent to obtain a foamable and cross-linkable composition, forming the composition into a desired shape maintaining its gel percent at zero, heating the shaped composition at a suitable foaming temperature under atmospheric pressure in such conditions that the peak of the ratio of the degree of cross-linking to the degree of decomposition of the blowing agent is not more than 20 to decompose the cross-linking agent and the blowing agent concurrently, thereby giving rise to a foamed product of cross-linked polyolefin having cells enclosed with very thin membranes capable of being easily ruptured by the action of mechanical force, and mechanically deforming said foamed product to rupture the cell membranes and to transform the closed cells into open cells.

DETAILED DESCRIPTION OF THE INVENTION

The method for the production of an open-cell foamed article of cross-linked polyolefin in accordance with the present invention consists primarily in utilizing the adjustment of the decomposition rate of the blowing agent relative to the rate of cross-linking reaction.

In the theory of the foaming of cross-linked polyolefin, the so-called ▷preceding cross-linking/following foaming", as mentioned above, is common sense to those skilled in the art. In other words, there has been considered that the expanding gas is leaked out from the resin at the time of expansion, unless the viscosity of resin is increased by virtue of its cross-linking. However, it has been found that the dilation of precedently cross-linked resin is poor and thus it is hardly possible to produce a foamed product having cells enclosed with very thin membranes suitable for obtaining an open-cell foamed article. Now it has been found, according to the present invention, that it is possible to produce said foamed product by concurrently effecting the cross-linking reaction and the foaming of the foamable and cross-linkable composition being maintained at the state where its gel percent is zero.

Now, the meaning of the expression "concurrent decomposition of cross-linking agent and blowing agent" will be explained.

Figure 1:
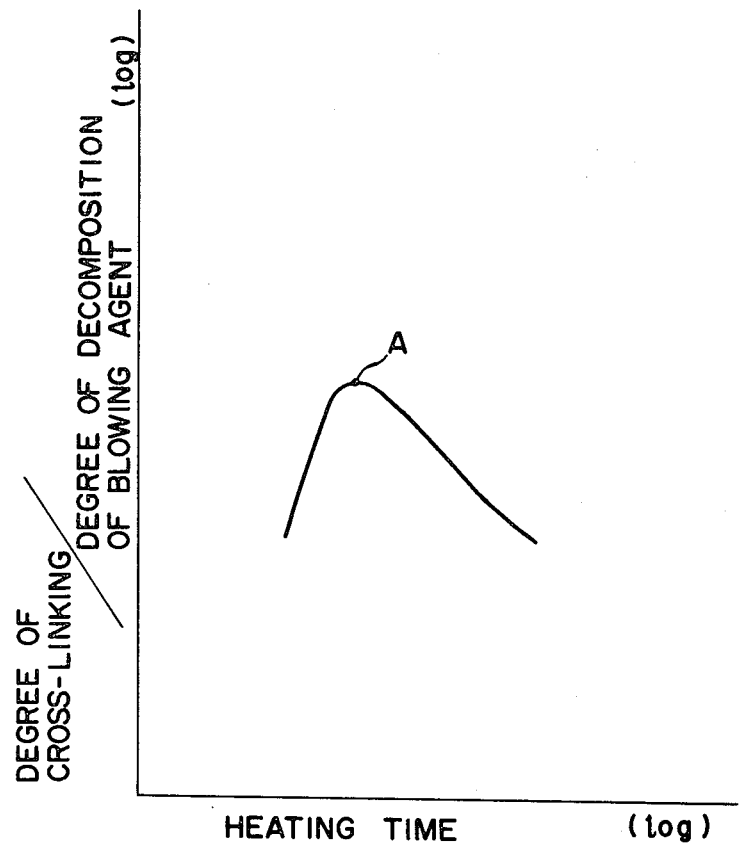
FIG. 1 is a graph showing the change of the ratio of the degree of cross-linking to the degree of decomposition of the blowing agent along the course of heating time at a suitable foaming temperature.

When the foamable and cross-linkable composition is heated under atmospheric pressure, the cross-linking reaction and the decomposition of blowing agent take place, and the cross-linking curve and the decomposition curve of blowing agent are respectively obtained. Now then, when the foamable and cross-linkable composition of which gel percent is maintained at zero is heated under atmospheric pressure and the ratio (y) of the degree of cross-linking to the degree of decomposition of the blowing agent against the heating time is plotted on logarithmic graph paper, there can be obtained the curve as shown in FIG. 1 of the accompanying drawing. However, in case the foamable composition cross-linked in advance as in the prior methods is heated under atmospheric pressure, the similar curve may not be obtained.

$$y = \frac{\text{Degree of cross-linking}}{\text{Degree of decomposition of blowing agent}}$$

Degree of cross-linking: Gel percent of resin at a certain heating time

Degree of decomposition of blowing agent: Ratio of the degree of expansion at the same heating time as above to the final degree of expansion of the foamed product obtained.

Where, the term "gel percent" means the ratio of the weight of the sample after extraction to that before extraction, wherein the extraction is carried out under reflux of trichloroethylene used as a solvent during 24 hours by means of a soxhlet extractor using a glass filter of from 40 to 50μ. The gel percent is calculated by the following equation. The degree of cross-linking is proportional to the increase of gel percent.

Gel percent =

$$\frac{W_1 - \left\{ \frac{A}{T}(1-x) + \frac{C}{T} \right\} W_o}{W_o - \left\{ \frac{A}{T}(1-x) + 0.7 \frac{A}{T}x + \frac{C}{T} \right\} W_o} \times 100$$

Where,
$W_o$: Weight of the sample before extraction,
$W_1$: Weight of the sample after extraction,
T: Total weight parts of the components,
A: Weight parts of the blowing agent,
C: Weight parts of the fillers,
X: Decomposition degree of the blowing agent,
$(A/T)(1-x)W_o$: Weight of the remaining blowing agent in the sample,
$0.7 (A/T)x\, W_o$: Weight of the residue of decomposed blowing agent in the sample, and
$(C/T)\, W_o$: Weight of the fillers in the sample.

In FIG. 1, the peak A of the curve indicates the ratio (y) of the degree of cross-linking to the degree of decomposition of the blowing agent at which the decomposition of blowing agent most lags behind the cross-linking of resin compound. That is to say, at the heating time of this point A the distance between the cross-linking curve and the decomposition curve of blowing agent is most wide. The greater value of this ratio (y) at the peak means that the foaming is more delayed to the cross-linking accordingly. On the other hand, the smaller value of said peak ratio means that the delay of the foaming to the cross-linking is little, that is to say, the cross-linking reaction and the foaming phenomenon of the foamable and cross-linkable composition concurrently took place.

Surprisingly, it has now been discovered that there is a limit of peak in said ratio (y) for obtaining a foamed product having cell membranes capable of being easily ruptured by the action of mechanical force. The peak value of said ratio (y) is influenced by the type of resins used and the amounts of the cross-linking agent or the blowing agent. However, in spite of these parameters, it has been found that in case said peak ratio is not more than 20, there can be obtained a foamed product having cell membranes suitable for manufacturing the open-cell foamed article. Said value "20" of the peak ratio is critical, but it is preferable to control said peak ratio in the range of not more than 15, because in case of the particular type of resins the rigidity is required for the reaction conditions, etc. at the value close to 20.

Therefore, the expression "concurrent decomposition of cross-linking agent and blowing agent" as used herein means that the decomposition of cross-linking agent and blowing agent is effected in such conditions that the peak of the ratio (y) is not more than 20. It will be a good practice to subject various polyolefins to a preliminary foaming to determine the range of the amounts of cross-linking agent, blowing agent, foaming aid, if required, and their optimum foaming temperatures which satisfy said conditions. In the actual operations, one can select the amounts of each components within the range thus determined.

Figure 2:
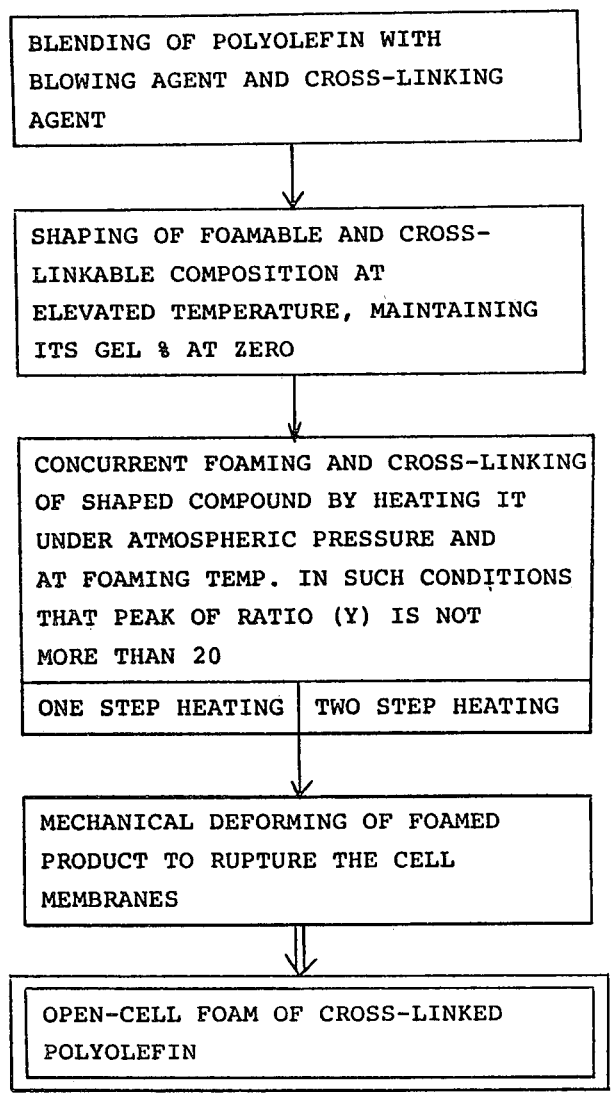
FIG. 2 is a flow diagram or chart showing the process steps for producing the open-cell cross-linked polyolefin product.

To describe the present invention more specifically, reference is made to the flow diagram of FIG. 2, and to the following description wherein a given polyolefin is mixed with a blowing agent, a cross-linking agent and, if required, a foaming aid, a filler and a pigment, and the resultant mixture is kneaded with a mixing roll heated or the like. Then, the obtained composition is placed in the mold having a desired cavity profile and, under the pressure applied with a press, thermally shaped at a temperature within the range of from 115° C. to 155° C., preferably from 120° C. to 140° C., and thereafter removed from the mold. In place of said shaping at an elevated temperature and under pressure, the composition after kneading may be shaped by heating it in the mold to which the pressure is not applied or by directly passing it through an extruder or a calendering roll. However, since the heating in this shaping step raises the foamable and cross-linkable composition to the thermally excited state and, as a result, contributes to the more smooth concurrent decomposition of the cross-linking agent and the blowing agent in the following foaming and cross-linking step, it is preferable to carry out the shaping of the composition under the heating. For instance, in case the shaping is carried out without heating and without applying a pressure, the cells of the foamed product obtained in the following foaming and cross-linking step are coarse and un-uniform, which is somewhat undesirable. In this thermal shaping it is significant that the foamable and cross-linkable composition should be shaped maintaining its gel percent at zero, namely at the predetermined heating time and temperature whereby the cross-linking of polyolefin will not occur. Therefore, the shaping temperature is required to be lower, preferably by more than 20° C., than the foaming temperature in the following foaming and cross-linking step. If the cross-linking of polyolefin occurs in this thermal shaping step, as being apparent from the comparative examples described hereinafter, there will be obtained a final product having an open cell ratio of less than 50% which cannot possibly seems to be the open cell foamed product. In addition, if said shaping is carried out at an elevated temperature and under pressure, as being apparent from Examples 11 to 15 described hereinafter, the cell size of the obtained foamed product becomes more fine as the heating time increases. Therefore, it is possible to delicately vary the appearance and the tactile impression of the final foamed article with varying heating time. By the way, in this thermal shaping step a very few amounts of blowing agent may be pre-decomposed, and as a result the shaped composition may expand to the degree of about 2 times larger than the original volume when removed from a mold. However, this phenomenon is not within the concept of the foaming and is acceptable to the present invention. There can be considered that the above-mentioned difference in cell size is due to the fact that the nuclei for cells may be formed by this pre-decomposition of blowing agent.

The foamable and cross-linkable composition shaped as above is then heated under atmospheric pressure thereby concurrently decomposing the blowing agent and cross-linking agent. The meaning of the expression "concurrent decomposing of blowing agent and cross-linking agent" and the conditions therefore has already been explained. In this foaming and cross-linking step the shaped composition is heated in an atmosphere of nitrogen or in a heating medium, for instance metal bath containing Rose's metal, Wood's metal or the like, oil bath, molten salt bath containing one or more of the salt such as sodium nitrate, potassium nitrate, potassium nitrite or the like. The shaped composition is preferably placed in an openable mold or metal box which is not airtight and heated in said heating medium kept at a suitable foaming temperature. Otherwise, the openable mold or metal box which is not airtight may be provided with a heater on the surface of its metal plate or with a jacket through which a heating medium such as steam, heating oil, etc. is circulated. By the use of this openable mold, the foamable composition is indirectly heated by the heater or heating medium. Besides, the shaped composition may be covered with a metal sheet, etc. capable of moving up and down and heated in such a state. After the heating for a predetermined period, the composition is cooled to obtain a cooled and foamed product. The foaming temperature is selected within the range of from 145° C. to 210° C., preferably from 160° C. to 190° C., to suit the particular type of polyolefin actually used, and the heating time is within the period of from 10 to 90 minutes, preferably from 15 to 40 minutes. Thus, there can be obtained a foamed article having closed cells which membranes are able to be easily ruptured by exerting a mechanical deformation and the degree of cross-linking similar to that of the foamed product produced by the prior methods (up to about 95% of gel percent).

In accordance with the present invention, the heating in said foaming and cross-linking step may be carried out in two steps. In this two-step process, the conditions for foaming and cross-linking polyolefin is mild, and thus the decompositions of cross-linking agent and blowing agent can be accomplished more concurrently in two steps. By this two-step process, the heterogeneous heat conduction in the direction of thickness of the foamable and cross-linkable composition may be eliminated and the composition may be homogeneously heated. As a result, there will not arise the phenomena such as the surface cracking resulting from the partial unevenness of foaming in the composition, the collapse and the escaping of gas. Furthermore, it is possible to increase the expansion ratio of the foamed article obtained up to about 70 times the original volume at will and the thickness up to about 150 mm. Therefore, this two-step process is particularly suitable for producing thicker foamed articles or the foamed articles having higher expansion ratios more than 20 times the original volume.

To describe this two-step foaming and cross-linking process more specifically, in the first step the foamable and cross-linkable composition shaped as mentioned above is heated in the same manner as mentioned hereinbefore, i.e. in the atmosphere of nitrogen or in the metal bath, molten salt bath, etc. at a temperature of from 145° C. to 180° C. for a period of from 5 to 60 minutes, preferably from 10 to 45 minutes, and thereafter the intermediate product is removed from the heating medium. In the second step, the intermediate product is further heated in the same manner as mentioned hereinafter at a temperature of from 170° C. to 210° C. for a period of from 5 to 50 minutes, preferably from 15 to 40 minutes, and subsequently cooled to give rise to a foamed article with low density. In said first step, it is preferable to decompose from 5 to 70% of blowing agent, whereat the gel percent of resin composition is reached to from about 20 to about 80%. If the degree of decomposition of the blowing agent and the gel percent are very high, the aforementioned advantages of this two-step process will not be derived.

The foamed article obtained as above is compressed by being passed between two rolls rotated at an equal speed, with the result that the compression so applied will rupture the membranes of closed cells of the foamed article and consequently convert the closed cell structure to the open cell structure.

The open-cell foamed article obtained by the method of this invention possessed outstanding properties favorably comparable with the properties of the foamed article of polyurethane, and the open cell ratio thereof determined in the similar manner to Remington Pariser Method (ASTM D 1940-62T) is equal or nearly equal to 100%.

The polyolefins which are preferably used in this invention are low-density polyethylene, medium-density polyethylene, high-density polyethylene, poly-1,2-butadiene, ethylenepropylene copolymer, ethylene-butene copolymer, ethylene-vinyl acetate copolymer, copolymers of ethylene with up to 45% of methyl-, ethyl-, propyl- or buthyl-acrylate or methacrylate, chlorinated products of the above homopolymers or copolymers which chlorine content being up to 60% by weight, mixtures of two or more of the above polymers and mixtures of the above polymers with isotactic or atactic polypropylene.

To suit the purpose of this invention, the cross-linking agent ought to decompose in polyolefin at a temperature at least higher than the flow point of polyolefin. Organic peroxides which deompose upon being heated to liberate free radicals capable of giving rise to intermolecular or intramolecular cross-linked bonds and, therefore, serve advantageously as radical generators meet this requirement. Examples of such organic peroxides include, but are not limited to: dicumyl peroxide, 1,1-ditertiary-butylperoxy-3,3,5-trimethyl cyclohexane, 2,5-dimethyl-2,5-ditertiary-butyl peroxyhexane, 2,5-dimethyl-2,5-ditertiary-butyl peroxyhexine, $\alpha,\alpha$-ditertiary-butyl peroxydiisopropyl benzene, tertiary-butyl peroxy ketone, tertiary-buthy peroxy benzoate, etc. The organic peroxide which best suits the particular type of polyolefin used should be selected.

The blowing agents which are usable in this invention are chemical blowing agents having the decomposition temperature higher than the melting point of polyolefin. Examples of such chemical blowing agents include, but are not limited to: azo type compounds such as azodicarbonamide and barium azodicarboxylate; nitroso type compounds such as dinitrosopentamethylene tetramine and trinitrosotrimethyl triamine; hydrazide type compounds such as p,p'-oxybis (benzene sulfonyl hydrazide); sulfonyl semicarbazide type compounds such as p,p'-oxybis (benzene sulfonyl semicarbazide) and toluenesulfonyl semicarbazide, etc.

Besides the particular type of polyolefin used and the foaming temperature selected, the amounts of the cross-linking agent and the blowing agent are the significant factor exerting influence on the ratio (y) of the degree of cross-linking to the degree of decomposition of the blowing agent. If the amount of cross-linking agent is too much or the amount of blowing agent is very little, the peak of said ratio (y) will easily exceed 20 and, as a natural consequence, it is hardly possible to produce an open-cell foamed article. Therefore, the amounts of the cross-linking agent and the blowing agent should be selected within the range in which the peak of said ratio (y) will no exceed 20.

Besides the above factors, it is possible to control the peak of ratio (y) by adding a foaming aid (See Example 1 and Comparative Example 1 described hereinafter). Thus, in the present invention, a foaming aid may be used depending on the particular type of blowing agent to be used. Examples of such aids include, but are not limited to: compounds having urea as a principal component; metal oxides such as zinc oxide and lead oxide; compounds having salicylic acid, stearic acid, etc. as a principal component, i.e. higher fatty acids, metal compounds of higher fatty acids, etc.

In the present invention, to effect the improvement of the properties of composition prepared and the reduction of cost, if desired, there may be added into the composition the compounding additives or fillers which do not exert very harmful influence on the cross-linkage of polyolefin, for example metal oxides such as carbon black, zinc oxide, titanium oxide, calcium oxide, magnesium oxide and silicon dioxide; carbonates such as magnesium carbonate and calcium carbonate; fibrous filler material such as pulp; various dyes; pigments; fluorescent materials; and rubber compounding ingredients commonly used.

Unlike the conventional technique which manages to obtain required reduction of the strength of the resin as by cooling the closed-cell foamed product to a temperature below the brittle temperature of the resin or adding large amounts of inorganic fillers to the foaming composition, the method of this invention utilizes the adjustment of the decomposition rate of the blowing agent relative to the rate of cross-linking of the resin. Consequently, this invention enables open-cell foamed articles of cross-linked polyolefins to be easily obtained without impairing the advantageous properties of polyolefins. In addition, the final foamed articles can be obtained by this invention with high open-cell ratios falling within the range of from 97 to 100% and in large thickness. The method of this invention has further advantages of easy operation, short working time and high productivity.

The open-cell foamed articles of cross-linked polyolefins obtained by the method of this invention can be suitably used for cushioning media, filters, heat insulating materials, coaters, etc. Particularly, when said foamed articles are used in clothes, noise abating materials and heat insulating materials so far produced by using soft polyurethane foams, they exhibit outstanding resistance to weathering and chemicals and high flame retardance and, therefore, warrant safe use.

For more specific illustration of the present invention, the following examples are presented which are intended to be merely illustrative of and not in any sense limitative of the invention.

EXAMPLE 1

A composition consisting of ethylene-vinyl acetate copolymer (proprietary product of Mitsui Polychemical co., Ltd., marketed under trade name of "Everflex P-1403", VAC 14% by weight), 17 parts by weight per hundred parts by weight of resin (phr) of azodicarbonamide (proprietary product of Eiwa Chemical Industry Co., Ltd., marketed under trade name of "Vinyhol AC#50S"), 0.83 phr of dicumyl peroxide and 0.5 phr of zinc oxide was kneaded in a mixing roll at 85° C. the resultant blend was charged in a mold (150×150×7 mm) within a press kept at 126° C. and heated under increased pressure for 30 minutes to form a foamable and cross-linkable sheet. The gel percent of this sheet was zero. The sheet obtained was then heated for 40 minutes in a metal bath kept at 170° C. to obtain an intermediary foamed product in which 30.5% of the blowing agent was decomposed. Thereafter, the intermediary foamed product was further heated in a metal bath kept at 190° C. for 20 minutes to obtain a foamed product in which the remaining blowing agent was completely decomposed. The peak value of the ratio (y) in said foaming and cross-linking step was 10.4. After the cooling, the foamed product was passed between two rolls separated by a space of 3 mm and rotated at an equal speed to rupture the cell membranes. The foamed article obtained had a thickness of 23.0 mm, a bulk density of 0.03 g/cm³ and an open cell ratio of 100%.

Wherein, the open cell ratio was measured in a similar manner to Remington Pariser method (ASTM D 1940-62T) and determined by the following calculation formula.

$$\text{Open cell ratio} = \frac{(V_s - V_R) - (\Delta V - V_R)}{V_s - V_R} \times 100$$

$$= \frac{V_s - \Delta V}{V_s - V_R} \times 100$$

Where,
$V_s$: Volume of sample,
$V_R$: Volume of resin matrix =weight of sampls $W_s$/density of resin), and
$\Delta V$: Increase in volume.

EXAMPLES 2-4

The procedure of Example 1 was repeated using the varying amounts of zinc oxide and dicumyl peroxide shown in Table 1-1. In each Example the complete open-cell foamed article having the open cell ratio of 100% was obtained. The degree of decomposition of the blowing agent in the intermediary foamed product was respectively 51.7% in Example 2, 69.0% in Example 3 and 11% in Example 4, and the peak value of the ratio (y) was 5.0 in Example 2, 1.27 in Example 3 and 4.0 in Example 4.

COMPARATIVE EXAMPLE 1

The procedure of Example 1 was repeated without using zinc oxide. The peak value of the ratio (y) in the foaming and cross-linking step was 20.5. The foamed article obtained had an open cell ratio of 55.3%, which exhibits that the rupture of cell membranes was effected only partially.

EXAMPLE 5

A foamed article was produced from a composition consisting of ethylene-vinyl acetate copolymer (proprietary product of Mitsubishi Petrochemical Co., Ltd. marketed under tradename of "Yukalon EVA-41H", VAC 16% by weight), 17 phr of azodicarbonamide and 0.53 phr of dicumyl peroxide in the same manner and under the same conditions as in Example 1. The open cell ratio of the foamed article obtained was 100%.

EXAMPLE 6

A composition consisting of the same resin as used in Example 5, 17 phr of azodicarbonamide, 0.08 phr of zinc oxide and 0.73 phr of dicumyl peroxide was kneaded in the same manner as in Example 1. The resultant blend was charged in a mold (140×140×28 mm) within a press kept at 126° C. and heated under increased pressure for 30 minutes to form a foamable block. The foamable block obtained was then heated in a metal bath kept at 170° C. for 40 minutes to obtain an intermediary foamed product in which 27% of blowing agent was decomposed. Thereafter, the intermediary foamed product was placed in an openable mold (370×370×110 mm) which is not air-tight, and heated in a metal bath kept at 190° C. for 30 minutes to decompose the remaining blowing agent completely. After the cooling, the foamed product was removed from the mold.

The foamed product was passed between two rolls separated by a space of 10 mm and rotated at an equal speed to rupture the cell membranes. The thick open-cell foamed article having a thickness of 100 mm, a bulk density of 0.03 g/cm³ and an open cell ratio of 100% was obtained.

EXAMPLE 7

A foamable sheet was obtained from a composition consisting of the same resin as used in Example 1, 17 phr of azodicarbonamide, 0.2 phr of zinc oxide and 0.63 phr of dicumyl peroxide in the same manner and under the same conditions as in Example 1. The foamable sheet obtained was heated in a metal bath kept at 190° C. for 15 minutes to completely decompose the blowing agent and cross-linking agent in a single stage, resulting in a foamed product. After the cooling, the foamed product was converted to an open-cell foamed article having an open-cell ratio of 100% by passing between two rolls rotated at an equal speed in the same manner as in Example 1.

EXAMPLE 8

An open-cell foamed article was produced from a composition consisting of the same resin as used in Example 5, 35 phr of azodicarbonamide, 0.53 phr of dicumyl peroxide under the same conditions as in Example 1. The open-cell foamed article highly expanded had an open-cell ratio of 100%, a thickness of 30 mm and a bulk density of 0.019 g/cm$^3$.

EXAMPLE 9

A composition consisting of low-density polyethylene (proprietary product of Mitsubishi Petrochemical Co., Ltd. marketed under the tradename of "Yukalon LK-30," density; 0.918 g/cm$^3$, MFR 40), 17 phr of azodicarbonamide and 0.2 phr of zinc oxide was intimately kneaded in a mixing roll at 100° C. The resultant blend was placed in a mold (150×150×7 mm) within a press kept at 136° C. and heated under increased pressure for 30 minutes to form a foamable sheet. This sheet was cross-linked and expanded under the same conditions as in Example 1, and thereafter passed between two rolls rotated at an equal speed in the same manner as in Example 1. An open-cell foamed article having an open-cell ratio of 100% and a thickness of 23 mm was thus obtained.

EXAMPLE 10

An open-cell foamed article was produced from a composition consisting of low-density polyethylene (proprietary product of Mitusbishi Petrocheminical Co., Ltd. marketed under the tradename of "Yukalon HE-30", density; 0.92 g/cm$^3$, MFR 0.5), 17 phr of azodicarbonamide and 0.13 phr of dicumyl peroxide under the same conditions as in Example 9. The open-cell foamed article had an open-cell ratio of 100% and a thickness of 23 mm.

EXAMPLES 11-15

The procedure of Example 1 was repeated using the same composition as in Example 1 and the varying heating time within a press of 1, 5, 10, 20 and 30 minutes. Each foamed article had an open-cell ratio of 100%, and the thickness of shaped article and its appearance was unchanged regardless of the heating time. However, the cell size was reduced with the increase of heating time.

COMPARATIVE EXAMPLES 2 AND 3

The foamed articles were produced from the same composition as used in Example 5, under the same conditions as in Example 5 except that the heating temperature within a press was changed to 145° C. (comparative example 2) and 151° C. (comparative example 3) respectively. After the step of compressing, the foamed articles were found by test to possess the open-cell ratios of 47.2% and 45.2% respectively, which exhibit that the rupture of cell membranes was obtained partially and the foamed articles will not function as an open-cell foamed article. Under the conditions, the gel percents of foamable sheets removed from a mold within a press were 20.0% at 145° C. and 31.2% at 151° C. respectively.

The operating conditions involved in the examples and comparatives examples cited above and the results respectively obtained are shown in the following Table 1. And the relation between the cell size of the final foamed product and the heating time in the shaping step in examples 11 to 15 is shown in Table 2.

TABLE 1

COMPOSITION AND SHAPING CONDITIONS

| No. of examples and comparative examples* | Resin | Composition (phr) Blowing agent (ADCA) | Foaming aid (zinc oxide) | Cross-linking agent (DCP) | Shaping Conditions under pressure Temp. (°C.) | Time (min) | Gel % of shaped sheet (%) |
|---|---|---|---|---|---|---|---|
| 1 | EVA "P-1403" | 17 | 0.08 | 0.83 | 126 | 30 | 0 |
| 2 | P-1403 | 17 | 0.20 | 0.83 | 126 | 30 | 0 |
| 3 | P-1403 | 17 | 2.50 | 0.83 | 126 | 30 | 0 |
| 4 | P-1403 | 17 | 0 | 0.33 | 126 | 30 | 0 |
| 5 | EVA "EVA-41H" | 17 | 0 | 0.53 | 126 | 30 | 0 |
| 6 | EVA-41H | 17 | 0.08 | 0.73 | 126 | 30 | 0 |
| 7 | EVA "P-1403" | 17 | 0.2 | 0.63 | 126 | 30 | 0 |
| 8 | EVA "EVA-41H" | 35 | 0 | 0.53 | 126 | 30 | 0 |
| 9 | LDPE "LK-30" | 35 | 0.2 | 0.53 | 136 | 30 | 0 |
| 10 | LDPE "HE-30" | 35 | 0 | 0.13 | 136 | 30 | 0 |
| 11 | EVA "P-1403" | 35 | 0.08 | 0.83 | 126 | 1 | 0 |
| 12 | P-1403 | 35 | 0.08 | 0.83 | 126 | 5 | 0 |
| 13 | P-1403 | 35 | 0.08 | 0.83 | 126 | 10 | 0 |
| 14 | P-1403 | 35 | 0.08 | 0.83 | 126 | 20 | 0 |
| 15 | P-1403 | 35 | 0.08 | 0.83 | 126 | 30 | 0 |
| 1* | EVA "P-1403" | 17 | 0 | 0.83 | 126 | 30 | 0 |
| 2* | EVA "EVA-41H" | 17 | 0 | 0.53 | 145 | 30 | 20.0 |
| 3* | EVA-41H | 17 | 0 | 0.53 | 151 | 30 | 31.2 |

TABLE 1

FOAMING CONDITIONS AND PROPERTIES OF FINAL PRODUCT

| No. of examples and comparative examples* | Conditions of one step foaming Temp. (°C.) | Time (min.) | Conditions of two step foaming first step Temp. (°C.) | Time (min.) | second step Temp. (°C.) | Time (min.) | Thickness of final open-cell foam (mm) | Bulk density of final open-cell foam (g/cm$^3$) | Open-cell ratio (%) |
|---|---|---|---|---|---|---|---|---|---|
| 1 | — | — | 170 | 40 | 190 | 20 | 23 | 0.030 | 100 |
| 2 | — | — | 170 | 40 | 190 | 20 | 23 | 0.030 | 100 |

TABLE 1-continued
FOAMING CONDITIONS AND PROPERTIES OF FINAL PRODUCT

| No. of examples and comparative examples* | Conditions of one step foaming | | Conditions of two step foaming | | | | Thickness of final open-cell foam (mm) | Bulk density of final open-cell foam (g/cm³) | Open-cell ratio (%) |
|---|---|---|---|---|---|---|---|---|---|
| | | | first step | | second step | | | | |
| | Temp. (°C.) | Time (min.) | Temp. (°C.) | Time (min.) | Temp. (°C.) | Time (min.) | | | |
| 3 | — | — | 170 | 40 | 190 | 20 | 23 | 0.030 | 100 |
| 4 | — | — | 170 | 40 | 190 | 20 | 23 | 0.030 | 100 |
| 5 | — | — | 170 | 40 | 190 | 20 | 23 | 0.030 | 100 |
| 6 | — | — | 170 | 40 | 190 | 30 | 100 | 0.030 | 100 |
| 7 | 190 | 15 | — | — | — | — | 23 | 0.030 | 100 |
| 8 | — | — | 170 | 40 | 190 | 20 | 30 | 0.019 | 100 |
| 9 | — | — | 170 | 40 | 190 | 20 | 23 | 0.030 | 100 |
| 10 | — | — | 170 | 40 | 190 | 20 | 23 | 0.030 | 100 |
| 11 | — | — | 170 | 40 | 190 | 20 | 23 | 0.030 | 100 |
| 12 | — | — | 170 | 40 | 190 | 20 | 23 | 0.030 | 100 |
| 13 | — | — | 170 | 40 | 190 | 20 | 23 | 0.030 | 100 |
| 14 | — | — | 170 | 40 | 190 | 20 | 23 | 0.030 | 100 |
| 15 | — | — | 170 | 40 | 190 | 20 | 23 | 0.030 | 100 |
| 1* | — | — | 170 | 40 | 190 | 20 | 23 | 0.030 | 55.3 |
| 2* | — | — | 170 | 40 | 190 | 20 | 20 | 0.030 | 47.2 |
| 3* | — | — | 170 | 40 | 190 | 20 | 20 | 0.030 | 45.2 |

TABLE 2

| No. of examples | Heating time in shaping step (min.) | Cell size (mm) |
|---|---|---|
| 11 | 1 | 1.5 |
| 12 | 5 | 0.9 |
| 13 | 10 | 0.8 |
| 14 | 20 | 0.6 |
| 15 | 30 | 0.6 |

What we claim is:

1. A method for the production of open-cell foamed articles of cross-linked polyolefins comprising the steps of:
   blending with heating a polyolefin, a chemical blowing agent and a cross-linking agent to obtain a foamable and cross-linkable composition,
   forming the foamable and cross-linkable composition into a desired shape under pressure and at a temperature of from 115° to 155° C. and which is lower than the foaming temperature of said composition while maintaining its gel percent at zero,
   heating the shaped composition at a suitable foaming temperature under atmospheric pressure to decompose the cross-linking agent and the blowing agent concurrently, the peak of the ratio of the degree of cross-linking to the degree of decomposition of the blowing agent being not more than 20, thereby giving rise to a foamed product of cross-linked polyolefin having cells enclosed with very thin membranes capable of being easily ruptured by the action of mechanical force, and
   mechanically deforming said foamed product to cause the membranes of the cells to rupture;
   wherein the gel percent is the ratio of the foamable and cross-linkable composition after extraction to that before extraction, the extraction being carried out under reflux of trichloroethylene as a solvent for 24 hours by means of a soxhlet extractor using a glass filter of from 40 to 50μ; the degree of cross-linking is the gel percent of the composition at a given heating time and the degree of decompositon of the blowing agent is the ratio of the degree of expansion at said given heating time to the final degree of expansion of the foamed composition.

2. The method according to claim 1, wherein the decomposition of the cross-linking agent and blowing agent in the shaped composition is effected more concurrently by the two step heating; in the primary heating from 5 to 70% by weight of the blowing agent originally present in said composition being decomposed, and in the secondary heating the undecomposed blowing agent and cross-linking agent remaining in the primary foamed product being decomposed at a higher temperature than that in the primary heating.

3. The method according to claim 1 or 2, wherein the decomposition of the cross-linking agent and blowing agent in the shaped composition is effected by heating the composition in a bath selected from the group consisting of metal bath, oil bath and molten salt bath or in an atmosphere of nitrogen gas.

4. The method according to claim 1, wherein the shaped composition is placed in an openable mold which is not airtight and provided with a heater or a jacket through which a heating medium is circulated, and the decomposition of the cross-linking agent and blowing agent in the shaped composition is effected by the indirect heating with the heater or the heating medium.

5. The method according to claim 1, wherein the foaming temperature of the shaped composition falls within the range of from 145° to 210° C.

6. The method according to claim 2, wherein the foaming temperature of the shaped composition falls within the range of from 145° to 180° C. in the primary heating and within the range of from 170° to 210° C. in the secondary heating.

7. The method according to claim 1, wherein the shaping of the foamable and cross-linkable composition is effected by use of an extruder or a calendering roll.

8. The method according to claim 1, wherein the mechanical deformation is effected by means of compression exerted with two rolls rotated at an equal speed.

9. The method according to claim 1, wherein the foamable and cross-linkable composition contains a foaming aid.

10. The method according to claim 1, wherein the foamable and cross-linkable composition contains a compounding agent or filler, such as metal oxides, carbonates, fibrous filler materials, dyes, pigments, fluorescent materials and rubber compounding ingredients.

11. The method according to claim 1, wherein the polyolefin is selected from the group of high-density polyethylene, medium-density polyethylene, low-density polyethylene, poly-1,2-butadiene, ethylene-propylene copolymer, ethylene-butene copolymer, ethylene-vinyl acetate copolymer, copolymers of ethylene with up to 45% of methyl-, ethyl-, propyl- or butyl-acrylates or methacrylates, chlorinated products of the above homopolymers or copolymers having chlorine content of up to 60% by weight, mixtures of two or more of the above mentioned polymers, and mixtures of the above mentioned polymers with atactic or isotactic polypropylene.

12. The method according to claim 1, wherein the cross-linking agent is an organic peroxide having a decomposition temperature higher than the flow temperature of polyolefin.

13. The method according to claim 1, wherein the blowing agent is selected from the group of azo type compounds, nitroso type compounds, hydrazide type compounds and sulfonyl semicarbazide type compounds possessed decomposition temperatures exceeding the melting temperature of polyolefin.

* * * * *